Oct. 21, 1924.

T. W. WARREN

AUTOMATIC GLASS FEEDING MACHINE

Filed Oct. 23, 1920    6 Sheets-Sheet 1

1,512,383

Inventor.
Thomas W. Warren.

Oct. 21, 1924.                                                                  1,512,383
T. W. WARREN
AUTOMATIC GLASS FEEDING MACHINE
Filed Oct. 23, 1920                        6 Sheets-Sheet 6

Inventor.
Thomas W. Warren.

Attorney.

Patented Oct. 21, 1924.

1,512,383

UNITED STATES PATENT OFFICE.

THOMAS WILLIAM WARREN, OF MONTREAL, QUEBEC, CANADA.

AUTOMATIC GLASS-FEEDING MACHINE.

Application filed October 23, 1920. Serial No. 419,042.

*To all whom it may concern:*

Be it known that I, THOMAS WILLIAM WARREN, 554 Des Erables Street, of the city of Montreal, in the Province of Quebec, Canada, having invented certain new and useful Improvements in Automatic Glass-Feeding Machines, do hereby declare that the following is a full, clear, and exact description of the same.

The present invention relates to automatic glass feeding devices and the principal object of same is to provide such a contrivance of this character that will feed to the glass making machines two or more streams of the glass of different temperatures as well as of different weights.

Another object of this invention is to provide a glass feeding device that can be easily and readily operated in connection with glass blowing or pressing machines, that may be installed at a relatively low cost, and whose care and maintenance are most inexpensive.

A further object of the invention is to provide a device for automatically feeding glass to the blowing or pressing machines that can be quickly and effectively connected to any retort or glass melting tank without even stopping the operation of, or the work being performed on or in connection with the said tank or any part thereof.

Another object of the same invention is to provide a feeder that will effectively supply glass to two or more glass making machines at the same time, and whereby the weight and temperature of the molten glass are accurately controlled according to conditions and other requirements.

Another object of the invention herein disclosed and claimed is in the provision of a glass feeding machine so designed and constructed and operated that, if at any time, should one or more of the glass making machines supplied by said feeder break down, become temporarily ineffective, or, should the manufacturer desire to stop the operation of one or more of the glass making machines for the purpose of changing moulds, for instance when one order for bottles is filled and another size or shape of bottle is required, the remaining glass making machines may be kept in operation without loss of glass material from the tank. This economy in operation and production is obtained by the fact that the feeder, embodying the present invention, being of duplex construction, one side of same may be stopped at any time, and the other side kept in operation.

Another objective advantage of the glass feeder herein described is that each side of same may be operated at different speeds according to the size of bottles or other articles that are required to be made by the glass blowing machines.

A still further object of this invention is in the provision of means whereby the feed and temperature of the molten glass supplied by one side of the feeder invented may be controlled by the speed of the blowing machine supplied by said side of the feeder.

Another object of the same invention is to provide a glass feeder that draws its own glass material from the tank and causes same to flow according to requirements to the glass blowing or making machines.

Another important object of the same is in the provision of a feeder that is capable of shaping determined portions of molten glass to any required shape previous to feeding same to the blowing machine or machines.

With the above and other objects in view which may appear as inherently related to the nature and scope of the invention, reference is now to be had, for the purpose of disclosing same, to the hereunto annexed drawings, wherein numeral designations used with regard to the various parts of same are identified by the same corresponding reference characters.

Of the above referred to drawings:

Figure 10 is a section in elevation of the glass shaping device or contrivance:

Figure 11 is a section in plan through line 11—11 designated in Figure 10.

Figure 1:
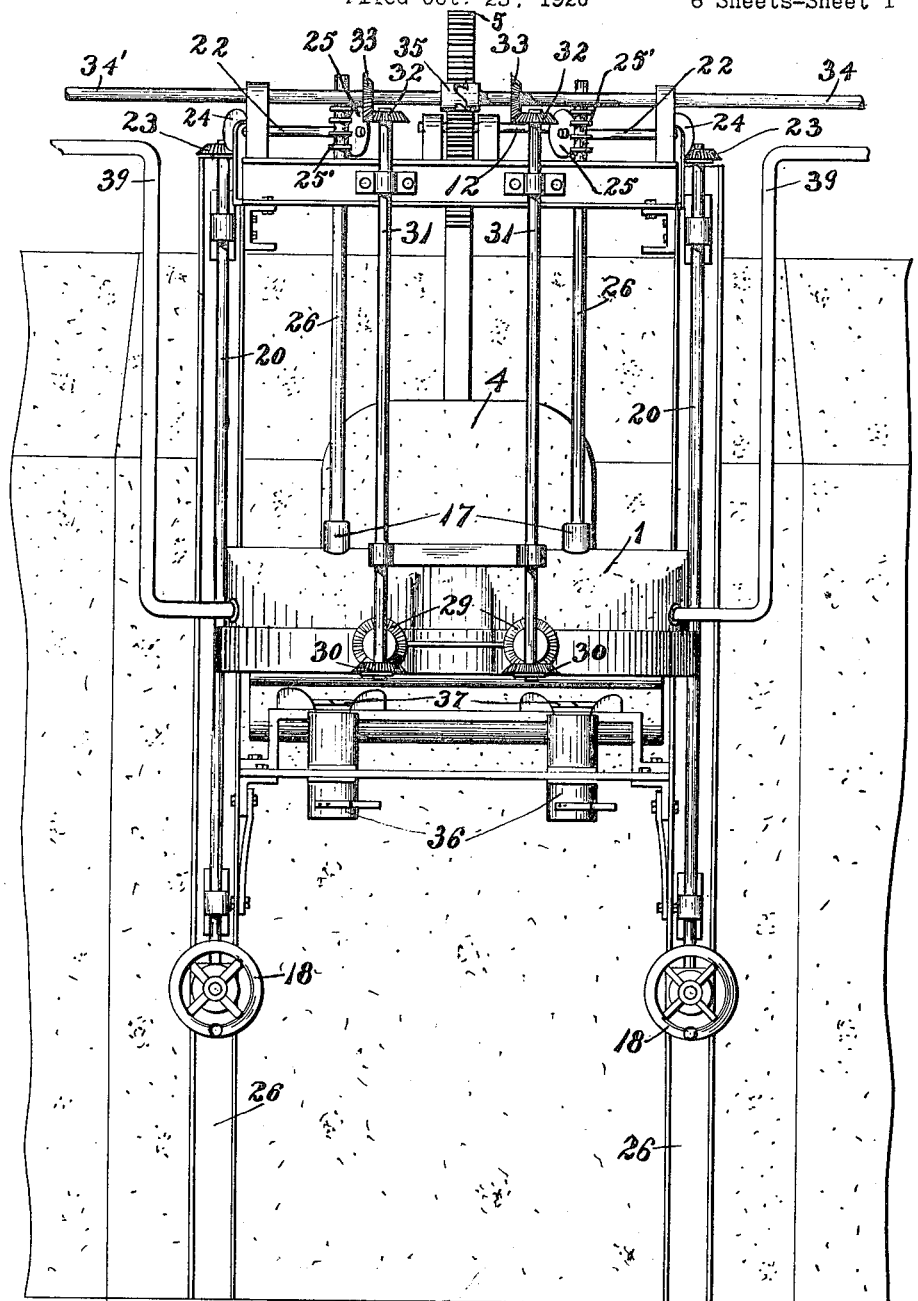
Figure 1 is a front elevation of the glass feeding apparatus or device.
Figure 2:
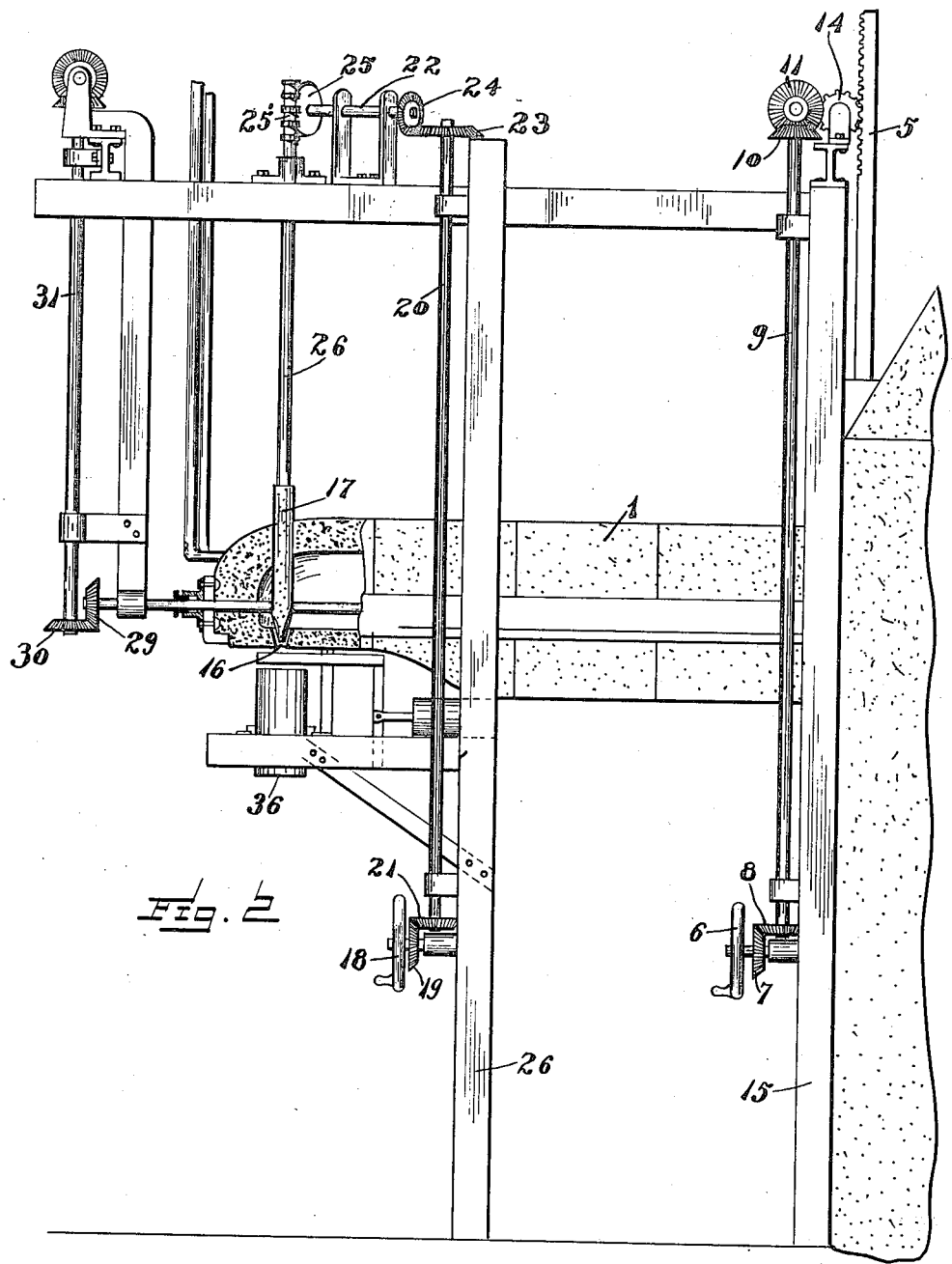
Figure 2 is a side elevation of same.
Figure 3:
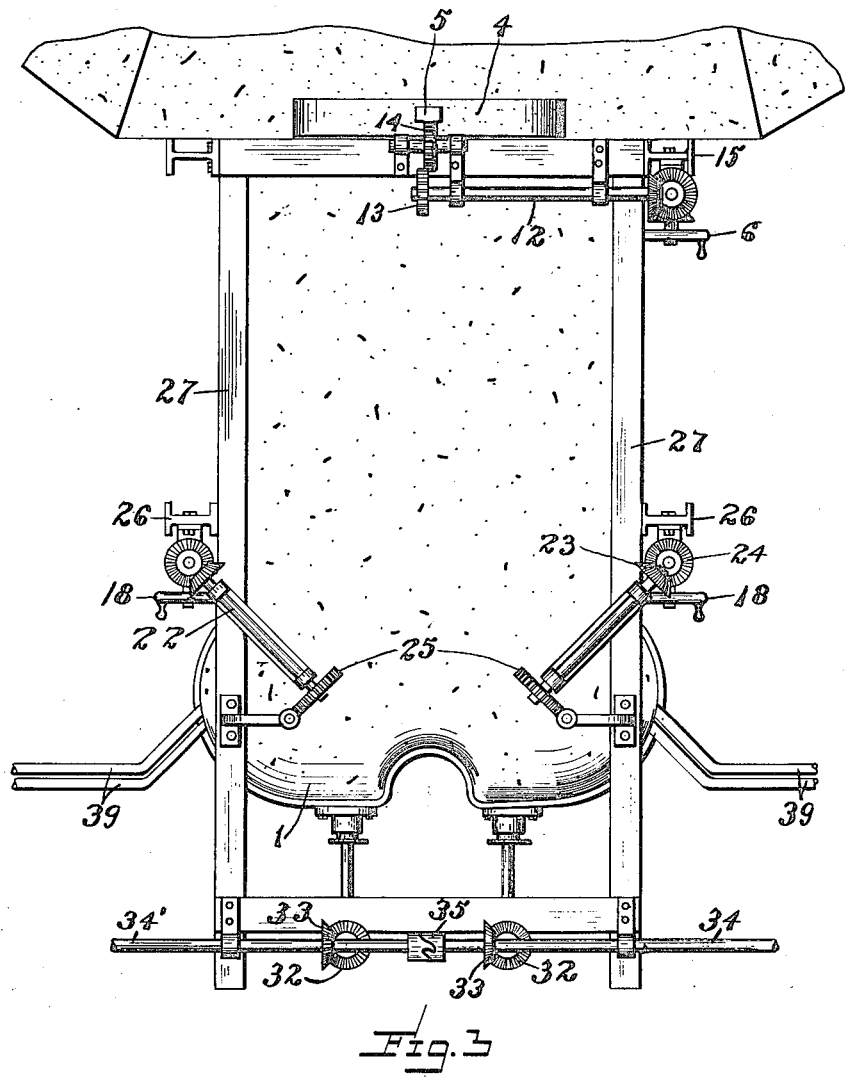
Figure 3 is a plan view of same.
Figure 4:
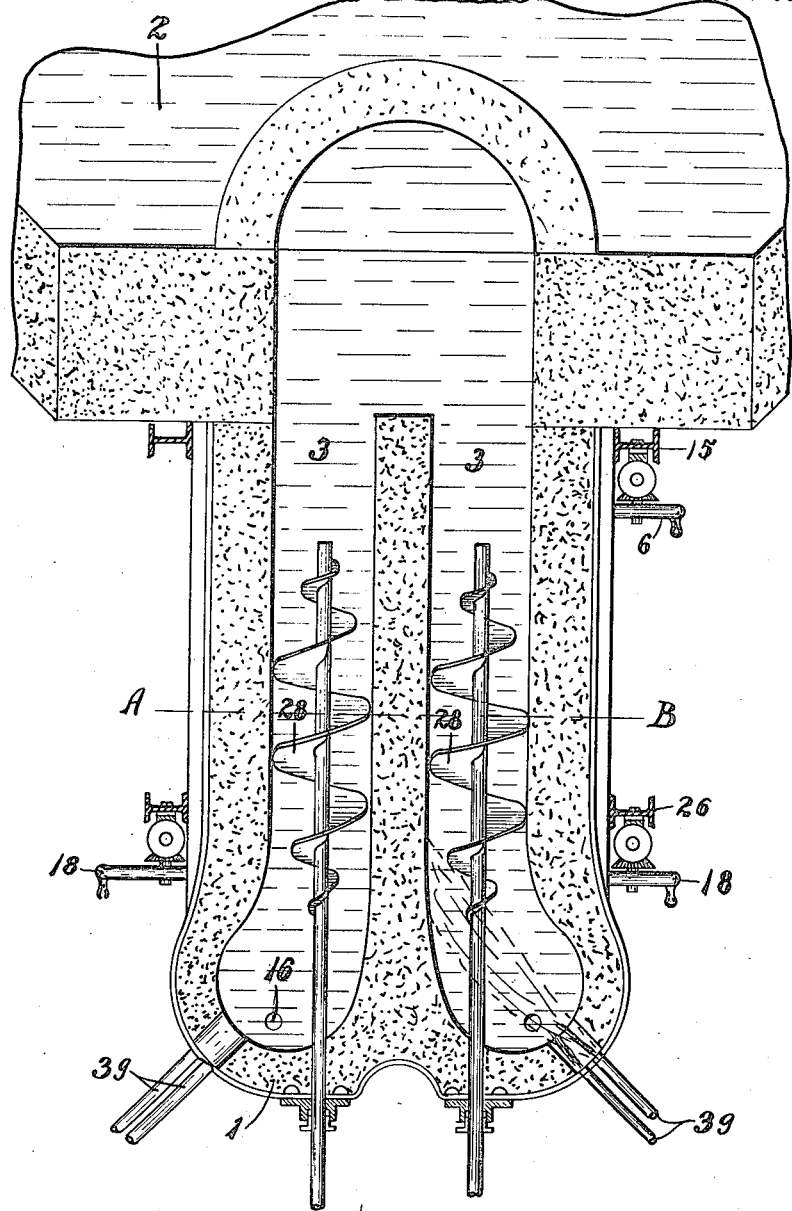
Figure 4 is a sectional plan view of same.
Figure 5:
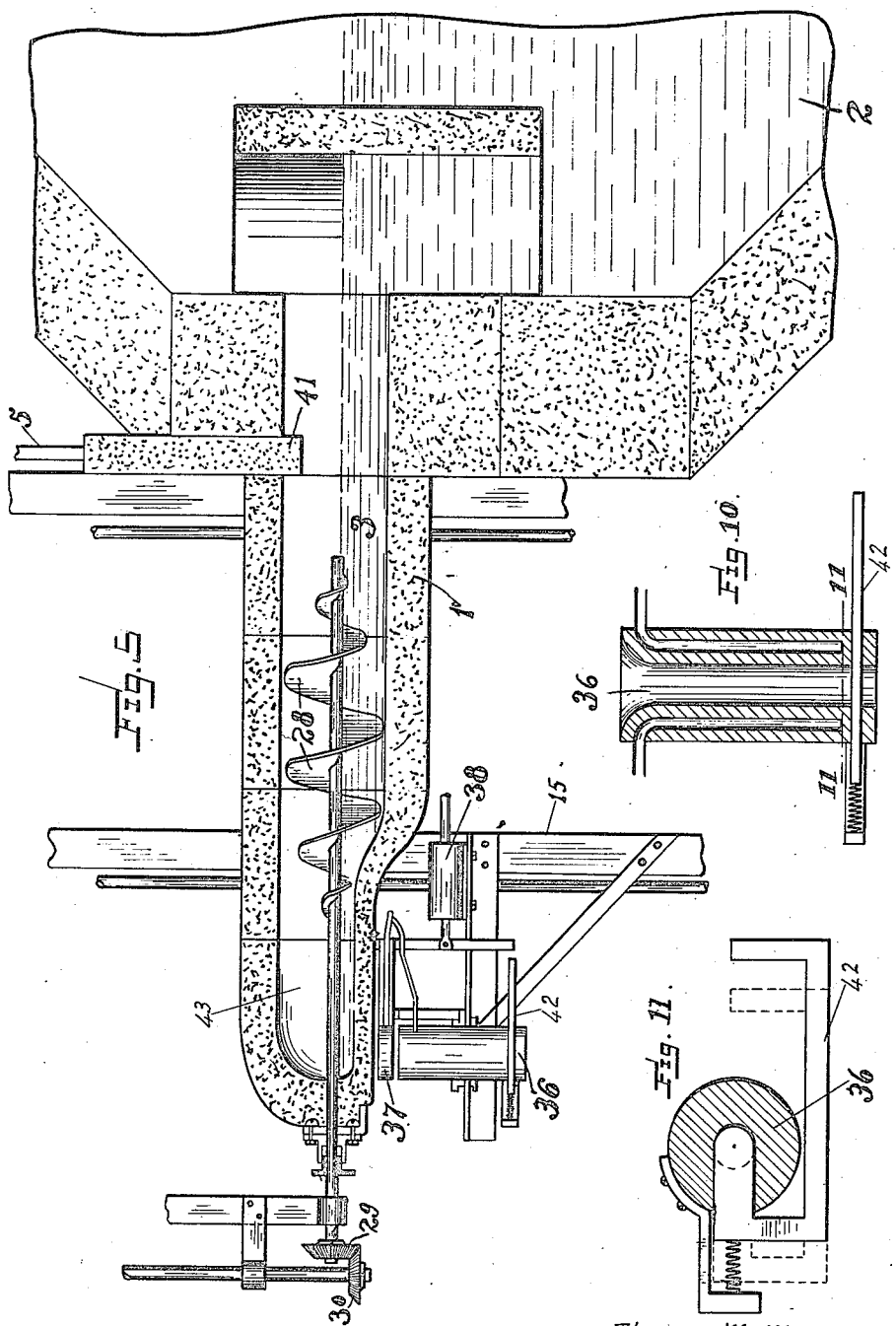
Figure 5 is a vertical section of same.
Figure 6:
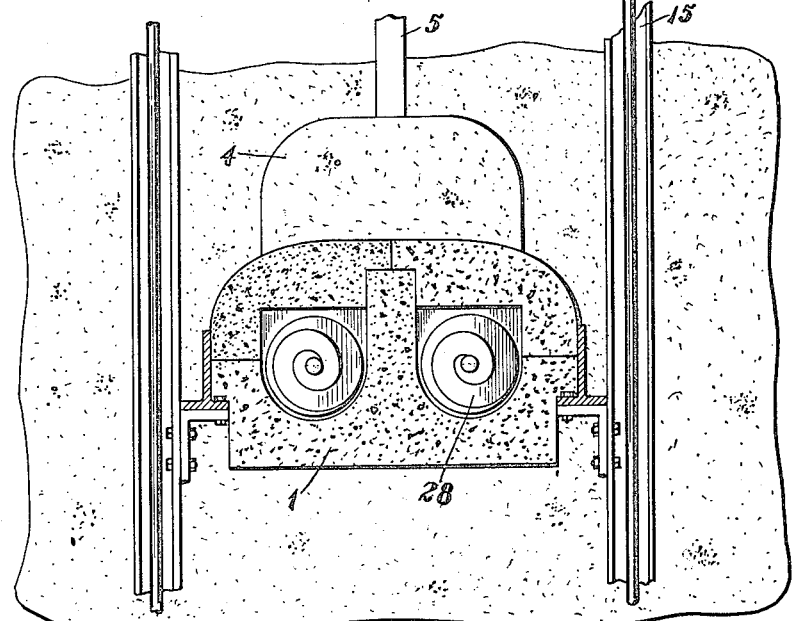
Figure 6 shows a cross section in elevation through line 4—4 designated in Figure 4.
Figure 7:
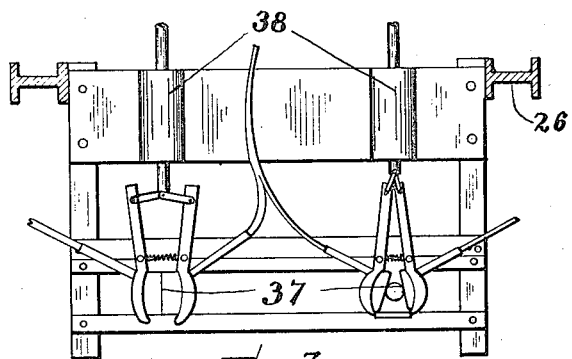
Figure 7 shows a plan view of the glass shearing mechanism.
Figure 8:
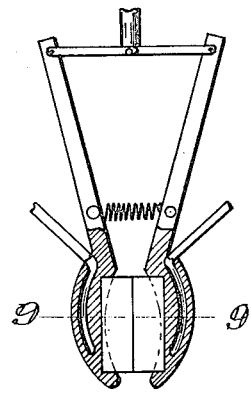
Figure 8 shows an enlarged plan view of one of the shears.
Figure 9:
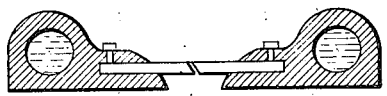
Figure 9 is a section in elevation through line 9—9 designated in Figure 8.

Reference is now to be had more particularly to the above mentioned drawings in view of fully disclosing the construction and operation of the present invention.

Numeral 1 indicates the body of the feeder, which is made of a plurality of clay blocks or other similar and suitable refractory material. This body is connected at one end with the molten glass tank 2, wherein an aperture in its vertical wall, is caused to coincide in size and alignment with the interior horizontal channels 3 of the said body portion 1. A vertical sliding door 41 whereby the flow of the glass and heated gases from the tank to the feeder are controlled. This door is operated by a rack 5. The reciprocating motion of the rack is obtained by the revolving of a hand-wheel 6 with which revolves a bevel gear 7 mounted on same shaft as said wheel. This gear 7 meshes with a bevel gear 81 rigidly mounted on the lower end of a transmission rod 9. The upper end of the said rod is keyed to a bevel gear 10, which meshing with another bevel gear 11 keyed on one end of a rod 12 revolves a spur gear 13 keyed on opposite end of said rod 12. This spur gear 13 engages with an idler gear 14, which in turn meshes with the said rack 5 which is thereby operated by the hand-wheel 6. The entire transmission scheme is suitably supported by a structural frame 15 which forms a part of the main structural framing adapted to conveniently support the feeder as well as all other accessories in relation thereto.

The body of the feeder is preferably constructed with a horizontal base in one block suitably supported on a frame, having two parallel semicircular channels 3—3 leading to raised level floored chambers 43 at the front end of the feeder. The base is covered by a separate set of blocks for each channel whereby either channel can be uncovered at any portion of its length without affecting the other channel.

The chambers preferably spread outwards and have outlets 16 through their floors which are separated by a space sufficient to enable independent receptacles to receive the molten glass and to be operated conveniently together or independently.

The molten glass coming through the feder from the said tank is allowed to flow through said outlet, but is there controlled by a valve spindle 17 whose end is adapted to obstruct or not the said outlet. This obstruction or release of the outlet is effectively controlled by the up and down motion of said valve spindle by means of the hand-wheel 18. A bevel gear 19 on the hand wheel spindle transmits its motion to a rod 20 through a bevel gear 21 keyed on one end of said rod and engaging said gear 19. The motion of said rod is transmitted to another rod 22 by means of two bevel gears in mesh 23 and 24 respectively keyed to the intersecting ends of the two said rods 20 and 22. A sprocket wheel 25 secured to opposite end of rod 22 and adapted to mesh with rack 25 secured to upper end of rod 2 with which is formed the valve spindle 17, provides for the up or down motion as required of said spindle whereby the opening and closing of the outlet 16 is regulated by the turning in one direction or the other of the hand operating wheel 18. Suitable bearings and supports for this transmission are provided for in connection with the structural frame 15.

The molten glass from the tank is fed towards the outlet of the feeder by means of a spiral conveyor element 28 located within each channel cavity of said feeder which as already stated is of duplex construction thereby necessitating a separate and distinct but similar operating mechanism for each side of same, which two mechanisms may however be coupled when it is required to operate the feeder at its full capacity.

The shaft of the spiral conveyor whose axis is preferably in alignment with the longitudinal axis of the channel of the feeder projects out through the front wall of said feeder and being conveniently supported carries a bevel gear 29 rigidly secured at its outer end. This gear meshes with a gear 30 mounted on the lower end of a rod or shaft 31. Keyed to the opposite upper end of the said shaft is another bevel gear 32 which engages the main driving gear 33 rigidly mounted on the main driving shaft 34 which receives its power from any suitable source.

As the construction of the feeder embodying this invention is duplex thus requiring a separate driving mechanism for each part, the main driving shafts 34 and 34' are provided with a coupling device 35 by means of which the two said shafts may be engaged and thereby driven by the same source of power. Otherwise when the shafts are uncoupled, a separate source of power may be applied to each or one of them may be allowed to rest as required.

As shown more particularly in the drawing 4 a dual conduit pipe 39 is provided for, whose end is in communication with the interior of the chambers of the feeder. From this dual pipe a mixture of oil and air is forced by any suitable means and the flame therefrom serves under regulated means to effectively adjust and control the temperature of the molten glass flowing out of the feeder.

The operation of the device is as follows:—

The molten glass from the tank enters the channels 3—3 wherein its temperature may be controlled by lowering the door 4 and cutting off the heated gases from the tank. The conveyors 28—28 carry the glass through the channels 3—3 and into the chambers 43—43. In these chambers the glass may be heated to the desired fluidity by the flame of the burners 39—39.

The valve 17 when raised from the outlet 16 permits the molted glass to flow into the forming receptacle 36. The shears 37 cut off the flow of glass as required and the gate 42 at the bottom of the forming receptacle 36 when opened permits the charge of glass cooled by the water jacket to pass out for further treatment in a blowing or pressing machine.

The glass can thus be fed to two different machines, at different temperatures, in different quantities and at different speeds.

By means of the sectional cover either channel or chamber on one side may be opened without affecting the other side.

Having thus fully disclosed my invention, what I claim as new and desire to secure by Letters Patent, is:

1. An automatic glass feeding device, comprising a duplex feeding element adapted to be aligned to an aperture in the wall of a glass tank with channels therein, a screw feed for drawing the molten glass from the said tank through the channels of the feeding element, means for heating the glass in the said feeding element, means for controlling the outlets of the said element, and a receptacle for shaping the said portions of glass fed from the said outlets.

2. An automatic glass feeding device comprising a two channelled feeding element adapted to be aligned to an aperture in the wall of a tank of molten glass, a screw feed for drawing the glass through the said channels, means for reheating the glass in the feeding element, outlets to the channels, means for controlling the outlets independently, means for shearing the glass flowing from the said outlets, a receptacle for forming the sheared glass and means for discharging the glass from the forming means as described.

3. In a glass feeding device the combination of a tank of molten glass, an aperture in the wall thereof and a sliding door thereto with a two channelled horizontal extension leading from the said aperture, a screw feed to convey the glass in each channel, means to heat the outer end of each channel and independent means to control the outlet from each channel.

4. In a glass feeding device the combination of a glass tank, an aperture in the wall thereof, and a sliding door thereto, with an extension adapted to align with the said aperture, comprising a body portion having two separate channels therein a screw feed in each channel separately controlled outlets therefrom adapted to feed the glass in different quantities.

5. In a glass feeding device the combination of a glass tank, an aperture in the wall thereof and a sliding door thereto, with an extension adapted to align with the said aperture, comprising a body portion having two separate channels therein, a screw feed in each channel separately controlled outlets therefrom and a separate means of heating the outer end of each channel, adapted to feed the glass at different temperatures.

6. In a glass feeding device the combination of a glass tank having a controlled aperture in the wall thereof, with an extension adapted to align with the said aperture comprising a body portion having two separate enclosed channels therein, conveyor screw in each channel, a chamber at the outer end of each channel, an outlet in the bottom of each chamber, a controlled valve to each outlet, and means to heat each chamber independently.

7. In a glass feeding device the combination of an extension adapted to align with an aperture in the wall of a glass tank, a body portion thereto, two enclosed channels with semi-circular bottoms, a screw conveyor in each channel two chambers with raised floors opening therefrom, with controlled outlets from each chamber.

8. In a glass feeding device, a body portion comprising a base having two semi-circular channels leading to raised horizontally floored extensions and a series of sectional blocks adapted to cover each channel and its extension.

9. In a glass feeding device, a body portion comprising a base having two parallel semi-circular channels therein, leading to raised horizontally floored outwardly flaring extensions and a series of sectional blocks adapted to cover each channel and its extension.

In witness whereof I have hereunto set my hand.

THOMAS WILLIAM WARREN.